(12) United States Patent
Kuo

(10) Patent No.: US 6,370,273 B1
(45) Date of Patent: Apr. 9, 2002

(54) METHOD AND SYSTEM FOR TILED IMAGE DATA DECOMPRESSION

(75) Inventor: David Kuo, San Jose, CA (US)

(73) Assignee: Flashpoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/058,699

(22) Filed: Apr. 10, 1998

(51) Int. Cl.⁷ .................................................. G06K 9/36
(52) U.S. Cl. ....................... 382/233; 382/248; 382/234; 358/433
(58) Field of Search ................................. 382/234, 307, 382/233, 232, 304, 248, 305, 250; 341/51, 67; 709/247; 345/501, 505, 502; 358/433, 432, 426, 261.3, 1.15, 430; 375/240.24, 240.25; 348/232, 231, 233, 552, 239

(56) References Cited

U.S. PATENT DOCUMENTS

| | | | | |
|---|---|---|---|---|
| 5,477,264 A | | 12/1995 | Sarbadhikari et al. ...... 348/231 |
| 5,568,139 A | * | 10/1996 | Yoon ........................... 341/67 |
| 5,596,423 A | * | 1/1997 | Pritchard .................... 358/433 |
| 5,633,678 A | | 5/1997 | Parulski et al. ............. 348/232 |
| 5,699,460 A | * | 12/1997 | Kopet et al. ................ 382/307 |
| 5,717,197 A | * | 2/1998 | Petrie ......................... 235/494 |
| 5,717,394 A | * | 2/1998 | Schwartz et al. ............ 341/51 |
| 5,764,801 A | * | 6/1998 | Munemasa et al. ......... 382/234 |
| 5,872,965 A | * | 2/1999 | Petrick ....................... 712/236 |
| 5,940,585 A | * | 8/1999 | Vondran, Jr. et al. ...... 348/1.15 |
| 5,995,727 A | * | 11/1999 | Wise et al. ................. 704/247 |

* cited by examiner

Primary Examiner—Leo Boudreau
Assistant Examiner—Ishrat Sherali
(74) Attorney, Agent, or Firm—Sawyer Law Group LLP

(57) ABSTRACT

Method and system aspects for reducing memory storage requirements during decompression of tiled image data are described. Included in a method aspect, and system for achieving same, are identification of a number of tiles in each row of an image, and decompression of a bitstream of compressed image data from the number of tiles in parallel to fill a band buffer with a minimum number of lines needed for processing a scan line of the image.

27 Claims, 9 Drawing Sheets

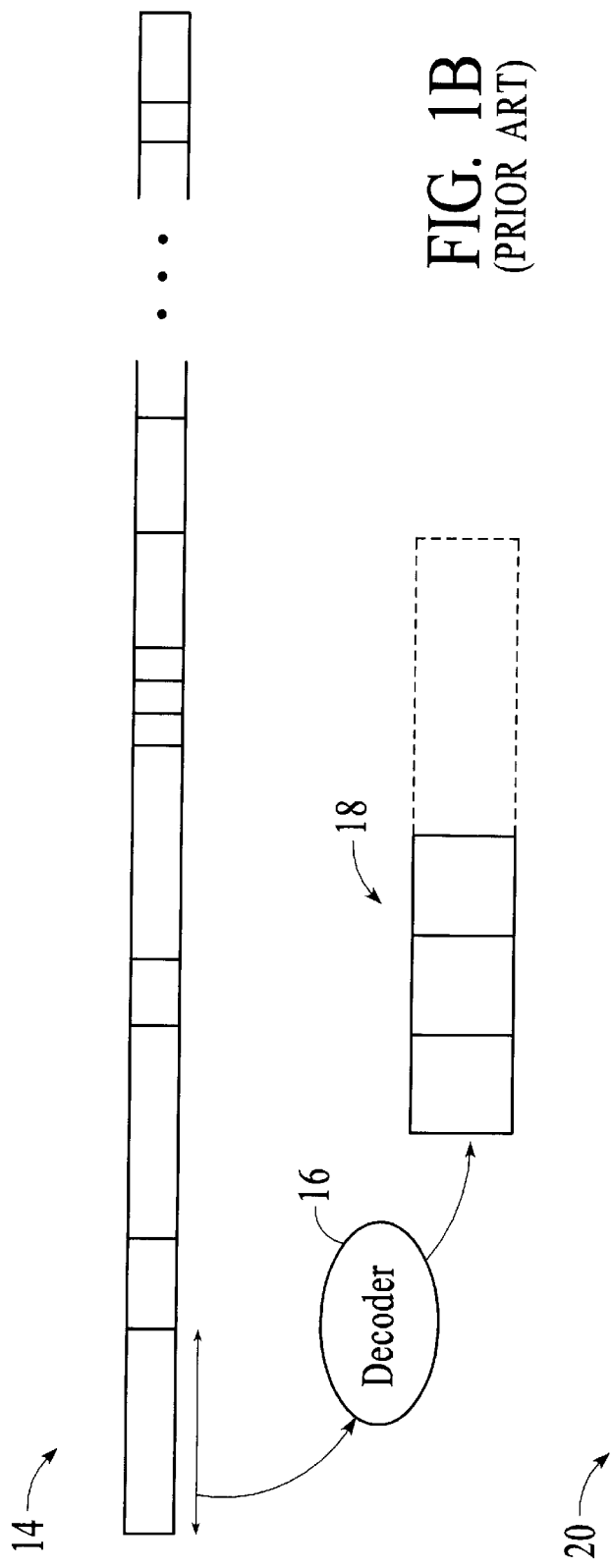
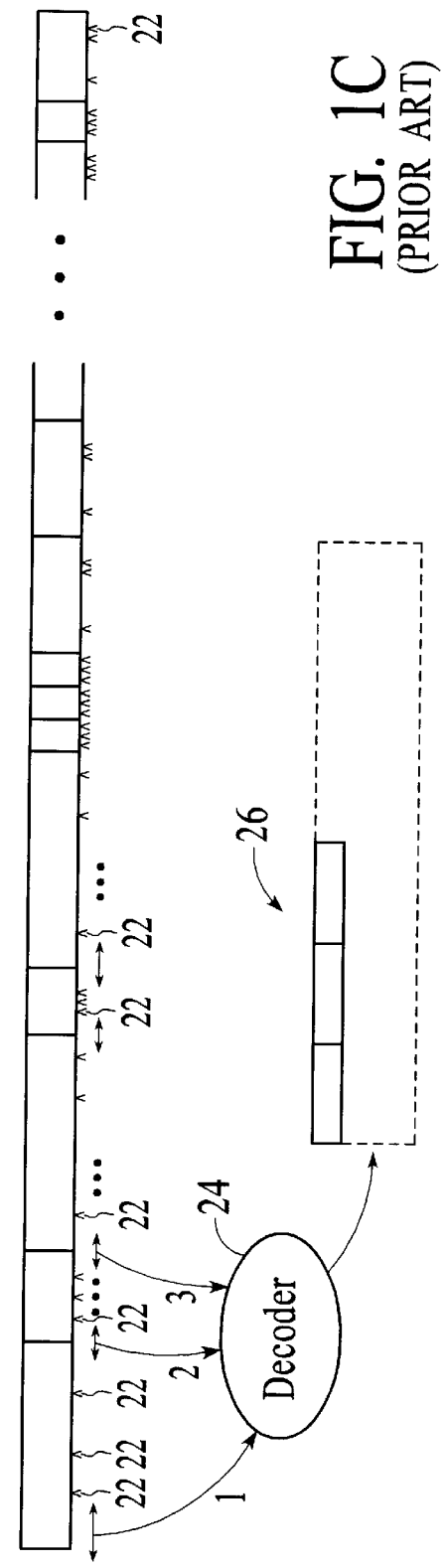
FIG. 1B (PRIOR ART)
FIG. 1C (PRIOR ART)

METHOD AND SYSTEM FOR TILED IMAGE DATA DECOMPRESSION

FIELD OF THE INVENTION

The present invention relates to digital image data decompression, and more particularly to a method and system for tiled digital image data decompression.

BACKGROUND OF THE INVENTION

Digital image data normally requires large amounts of memory. Compression of image data attempts to reduce the amount of memory needed when storing and transferring image data. In compressing image data, typically images are broken up into blocks of image data. A standard for image data compression, JPEG (Joint Photographic Expert Group), produces variable length bitstreams from blocks of image data. Normally, JPEG compression operates on 8×8 or 16×16 blocks of pixel image data, scanned along the rows of an image. Some systems utilize tile-based data by breaking an image into large tiles which are then broken down into blocks for compression. FIG. 1a illustrates an image 10 broken up into four rows of six tiles 12. By way of example, each tile comprises 64×64 blocks, or 4×4 macroblocks of 16×16 blocks.

JPEG compressed tiled image data is typically decoded one tile at a time. Normal JPEG decompression is only interruptible after the completion of a well-defined unit of incoming compressed data and never halted in the middle of a bitstream. Thus, implementation is required to halt on boundaries defined by the incoming bitstream. In many imaging systems, entire rows of data are utilized, thus requiring decompression of multiple tiles. Usually, buffering of a band of data occurs, where the number of lines in the band equals the number of lines in a tile. However, each row in the band is usually processed only once, so that the extra buffering required to store all the lines of the tile at once is quite inefficient, since the extra buffering is only required to reorganize the incoming data.

FIG. 1b illustrates such extra buffering. A compressed stream of data 14 having variable length data segments and known tile boundaries is decompressed through a decoder 16 and stored in a band buffer 18, the band buffer having a number of lines equal to the number of lines in a tile, e.g., 64. Each entire tile is decompressed and stored in the band buffer 14 before a next tile is decompressed through decoder 16, band buffer 18 illustrating the storage of three tile's worth of data with three more tiles needing to be decoded before an entire row of data of image 10 is complete. However, usually the number of the lines in a tile necessary to produce an output of an entire row of the image 10 is smaller than the total number of lines in a tile, e.g., 16 lines. Thus, extra memory is used and wasted on storing the lines beyond the needed number of lines.

One method used to reduce the storage requirement for tiled image data decompression is to insert markers during compression. The markers, which are allowed but not required in the JPEG standard, identify chosen tile boundaries in the compressed data stream. For example, FIG. 1c illustrates a compressed stream of data 20 having markers 22 positioned within the stream 20 during compression. Using these markers, a decoder 24 scans the incoming data stream to identify the edge of each tile and only decompresses a first segment in each tile as designated by the markers 22. The memory requirements, i.e., the number of lines for band buffer 26, are thereby reduced by only decompressing the first segment in each tile across a row, e.g. a first set of sixteen lines, rather than an entire tile, e.g., 64 lines, to determine the data for a row in the image. Unfortunately, the use of markers is limiting and problematic, since the JPEG standard does not require that markers be placed in the compressed data stream, nor does it require that such markers be placed on the edges of tiles. Thus, such decompression techniques are inapplicable with systems that do not utilize such markers and create more complicated image processing.

Accordingly, what is needed is a system and method for decompressing tiled image data that requires minimal memory and has broader application than the use of externally imposed markers in compressed data streams. The present invention addresses such a need.

SUMMARY OF THE INVENTION

The present invention provides method and system aspects for reducing memory storage requirements during decompression of tiled image data. Included in a method aspect, and system for achieving same, are identification of a number of tiles in each row of an image, and decompression of a bitstream of compressed image data from the number of tiles in parallel to fill a band buffer with a minimum number of lines needed for processing a scan line of the image.

With the present invention, any tile-based compressed stream of data is capably decompressed without requiring adequate memory for concurrent storage of each entire tile's decompressed data. Rather, minimal memory is utilized since a minimum number of lines of decompressed data needed to output a scan line of an image are stored during decompression. Further, the present invention successfully achieves the reduction in memory requirements without requiring the placement and reliance on restart markers within a compressed bitstream. These and other advantages of the aspects of the present invention will be more fully understood in conjunction with the following detailed description and accompanying drawings.

BRIEF DESCRIPTION OF THE DRAWINGS

FIGS. 1b and 1c illustrate prior art decompression techniques.

DETAILED DESCRIPTION OF THE INVENTION

The present invention relates to an improvement in decompression of digital images, including those captured in digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 2:
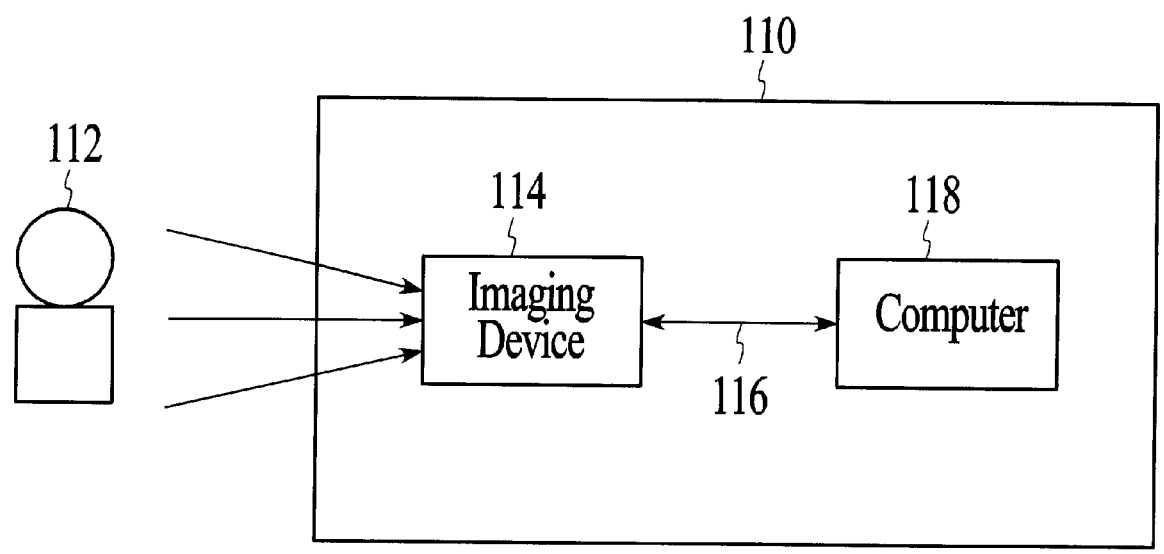
FIG. 2 is a block diagram of a digital camera that operates in accordance with the present invention.

FIG. 2 is a block diagram of a digital camera 110 shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 3:
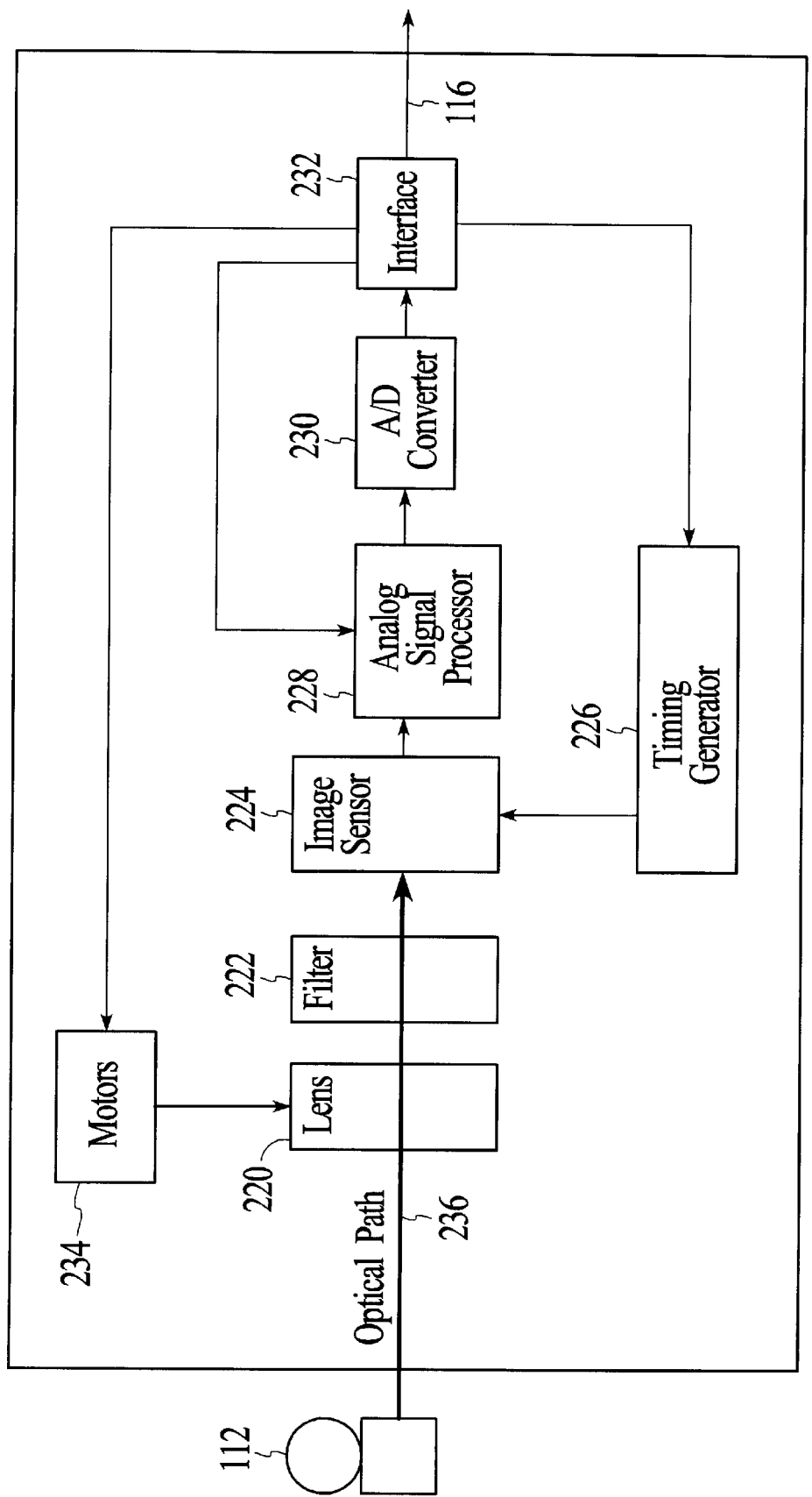
FIG. 3 is a block diagram of one embodiment for the imaging device of FIG. 2.

Referring now to FIG. 3, a block diagram of one embodiment of imaging device 114 is shown. Imaging device 114 typically comprises a lens 220 having an ills, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 4:
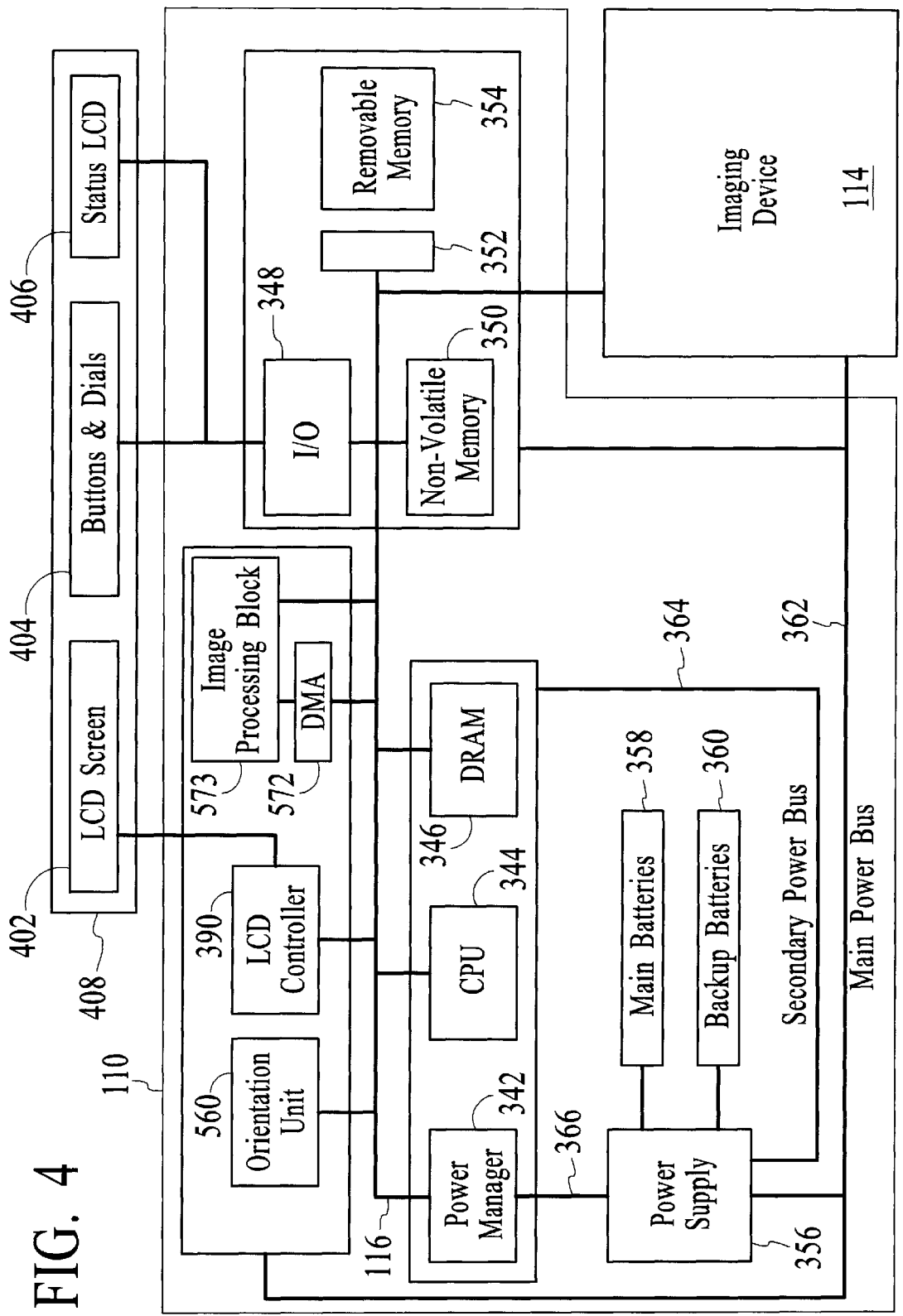
FIG. 4 is a block diagram of one embodiment for the computer of FIG. 3, where image processing is done at least partially in hardware.

Referring now to FIG. 4, a block diagram of one embodiment for computer 118 is shown. In one embodiment, the computer 118 in FIG. 4 provides at least a portion of image processing in hardware using image processing block 573. Thus, in one embodiment the computer 118 has DMA unit 572 for transfers of data to and from the image processing block 573. However, nothing prevents the method and system from being used in a camera 110 which processes image data in software. In such a system, the image processing block 573 would be omitted. In one embodiment, DMA 572 is programmable by the central processing unit (CPU) 344.

System bus 116 provides connection paths between imaging device 114, an optional power manager 342, CPU 344, dynamic random-access memory (DRAM) 346, input/output interface (I/O) 348, non-volatile memory 350, DMA 572, image processing block 573, orientation unit 560, and buffers/connector 352. Removable memory 354 connects to system bus 116 via buffers/connector 352. Alternately, camera 110 may be implemented without removable memory 354 or buffers/connector 352. The orientation unit 560 can sense which position the digital camera 110 is currently in. The orientation unit 560 also sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera I/O user via buffers/connector 352. Thus, a user who possesses several removable memories 354 may replace a full removable memory 354 with an empty removable memory 354 to effectively expand the picture-taking capacity of camera 110. In one embodiment, removable memory 354 is implemented using a flash disk. Power supply 356 supplies operating power to the various components of camera 110. In one embodiment, power supply 356 provides operating power to a main power bus 362 and also to a secondary power bus 364. The main power bus 362 provides power to imaging device 114, I/O 348, non-volatile memory 350, LCD controller 390, orientation sensor 560, DMA 572, image processing chain 573, and removable memory 354. The secondary power bus 364 provides power to power manager 342, CPU 344 and DRAM 346.

Power supply 356 is connected to main batteries 358 and also to backup batteries 360. In one embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 5:
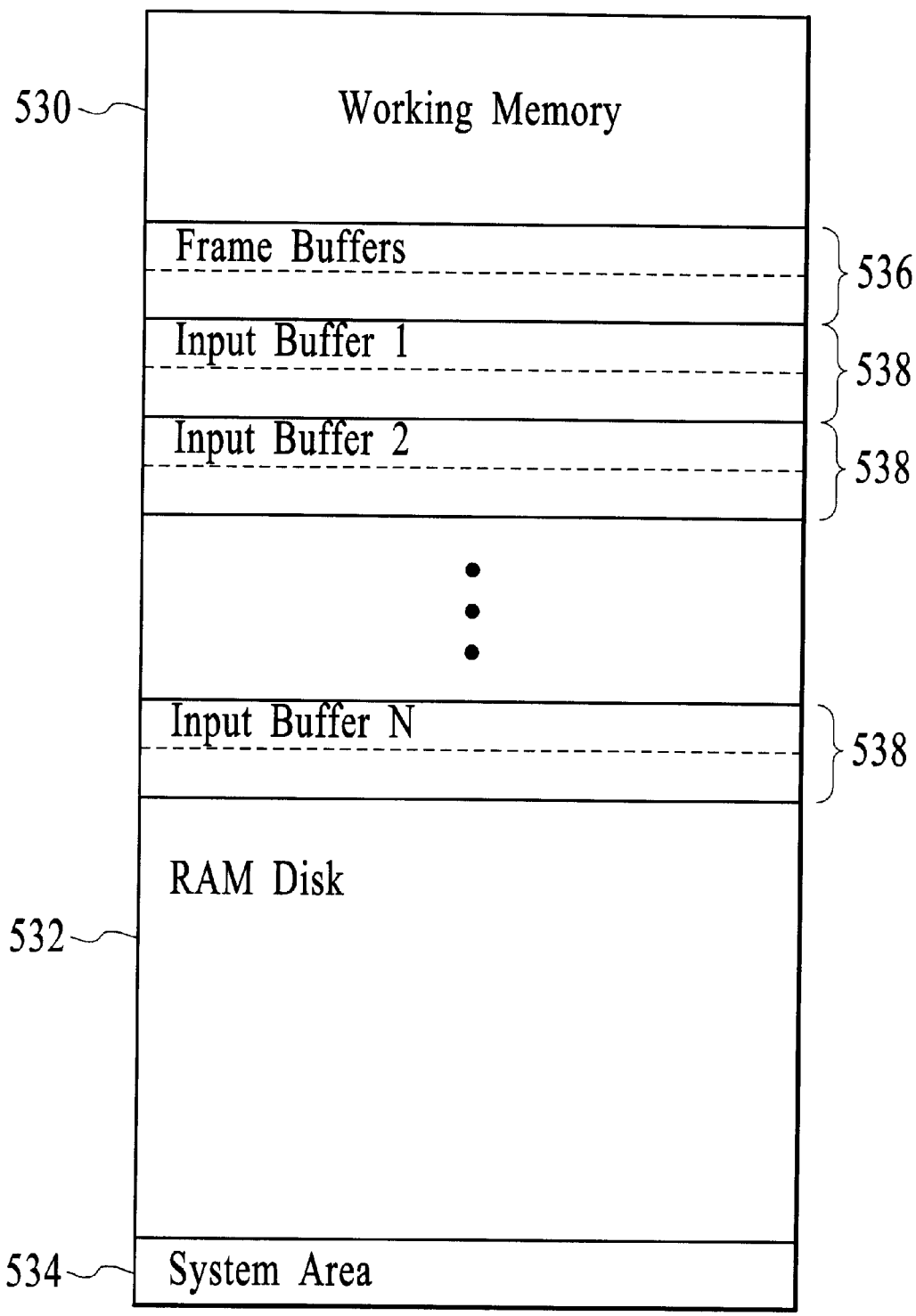
FIG. 5 is a memory map showing one embodiment of the Dynamic Random-Access-Memory (DRAM).

Referring now to FIG. 5, a memory map showing one embodiment of dynamic random-access-memory (DRAM) 346 is shown. In the preferred embodiment, DRAM 346 includes RAM disk 532, a system area 534, and working memory 530.

RAM disk 532 is an optional memory area used for storing raw and compressed image data and typically is organized in a "sectored" format similar to that of conventional hard disk drives. In one embodiment, RAM disk 532 uses a well-known and standardized file system to permit external host computer systems, via I/O 348, to readily recognize and access the data stored on RAM disk 532.

System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers or one input buffer 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402.

Each separate buffer of the input buffers 538 alternates between an input cycle and a processing cycle. During the input cycle, the input buffers 538 are filled with raw image data from the imaging device 114, and during the processing cycle, CPU 344 processes the raw data and transmits the processed data to the frame buffers 536. For example, during the execution of a live view generation process, the CPU 344 takes the raw image data from the input buffers 538, typically in CCD format, and performs color space conversion on the data. The conversion process performs gamma correction and converts the raw CCD data into either a RGB or YCC color format which is compatible with the LCD screen 402. (RGB is an abbreviation for Red, Green, Blue, and YCC is an abbreviation for Luminance, Chrominance-red and Chrominance-blue). After converting the data to YCC, the YCC image data is stored in the frame buffer 536. The LCD controller 390 then transfers the processed image data from the frame buffers to the LCD screen 402 for display.

Figure 6:
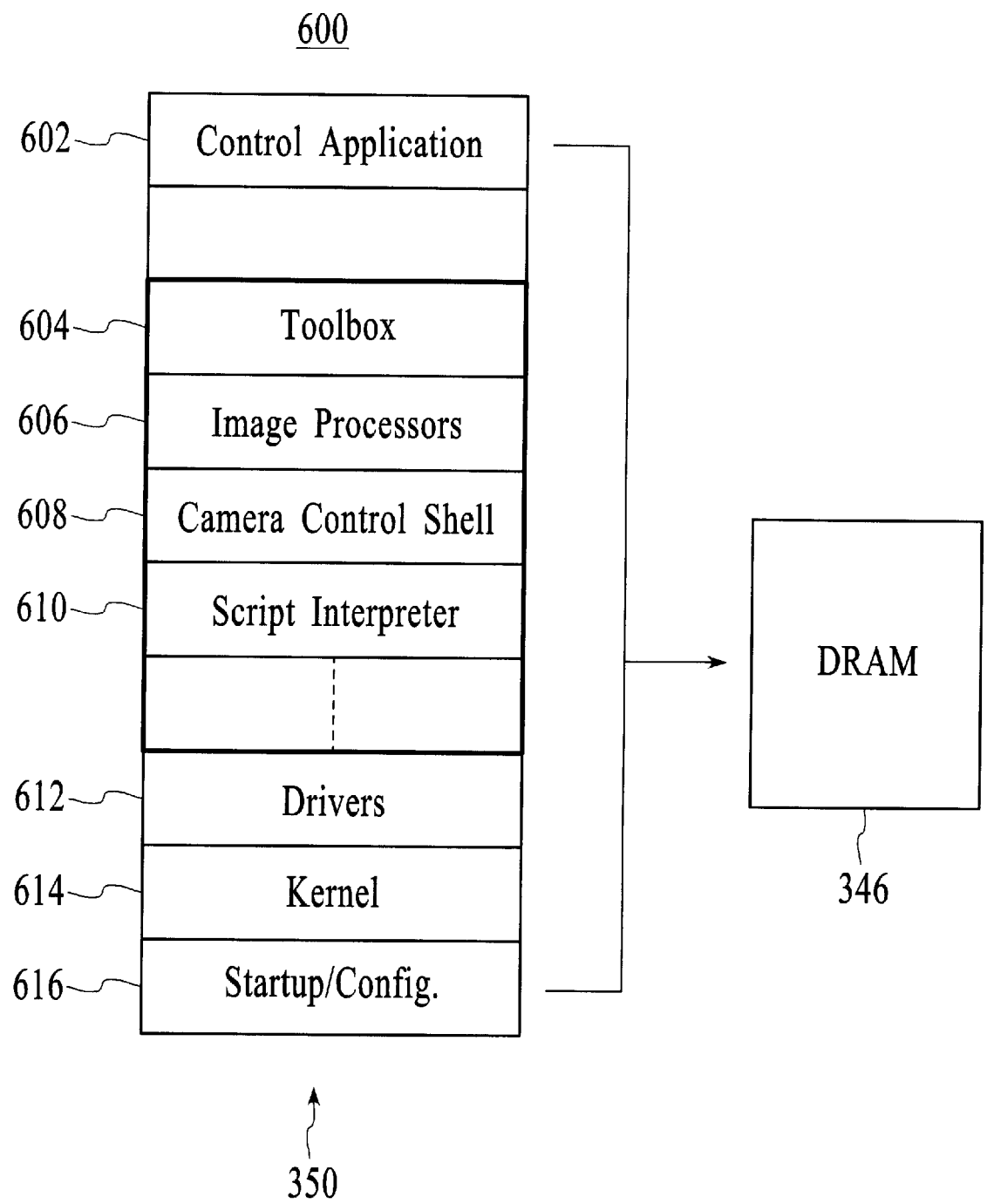
FIG. 6 is a block diagram illustrating the contents of the nonvolatile memory where software is stored and the DRAM where the software is executed.

FIG. 6 is a block diagram illustrating the contents of nonvolatile memory 350 where software 600 is stored and DRAM 346 where the software is executed. The software 600 may include a control application 602, a toolbox 604, drivers 612, a kernel 614, and a startup/configuration module 616. The control application 602 is the main program that controls high-level functions of the digital camera 110 and is responsible for interfacing with functions in the toolbox 604. The toolbox 604 comprises selected function modules that control how the digital camera 110 captures and manipulates images. The modules may include image processors 606, a camera control shell 608, and a script interpreter 610. Image processors 606 are programs for enhancing (e.g., adjusting the contrast, sharpening, converting the image to gray-scale, etc.) the digital image received from the imaging device 114. Camera control shell 608 receives and processes data structures for controlling camera functions. Script interpreter 610 translates and executes script statements, which are used to provide directed image capture sequences and other camera 110 features. Drivers 612 comprise program instructions for controlling various camera 110 hardware components, such as motor 234 (FIG. 3) and a flash (not shown). Kernel 614 comprises program instructions providing basic underlying camera services including synchronization routines, task creation, activation and deactivation routines, resource management routines, etc. Startup/configuration 616 comprises program instructions for providing initial camera 110 start-up routines such as the system boot routine and system diagnostics.

When the camera 110 is first turned on and booted up, the startup/configuration module 616 begins to execute and loads the drivers 612, the kernel 614, the control application 602, and system files containing configuration information into DRAM 346. Thereafter, operation of the camera 110 is passed to the control application 602.

Figure 1A:
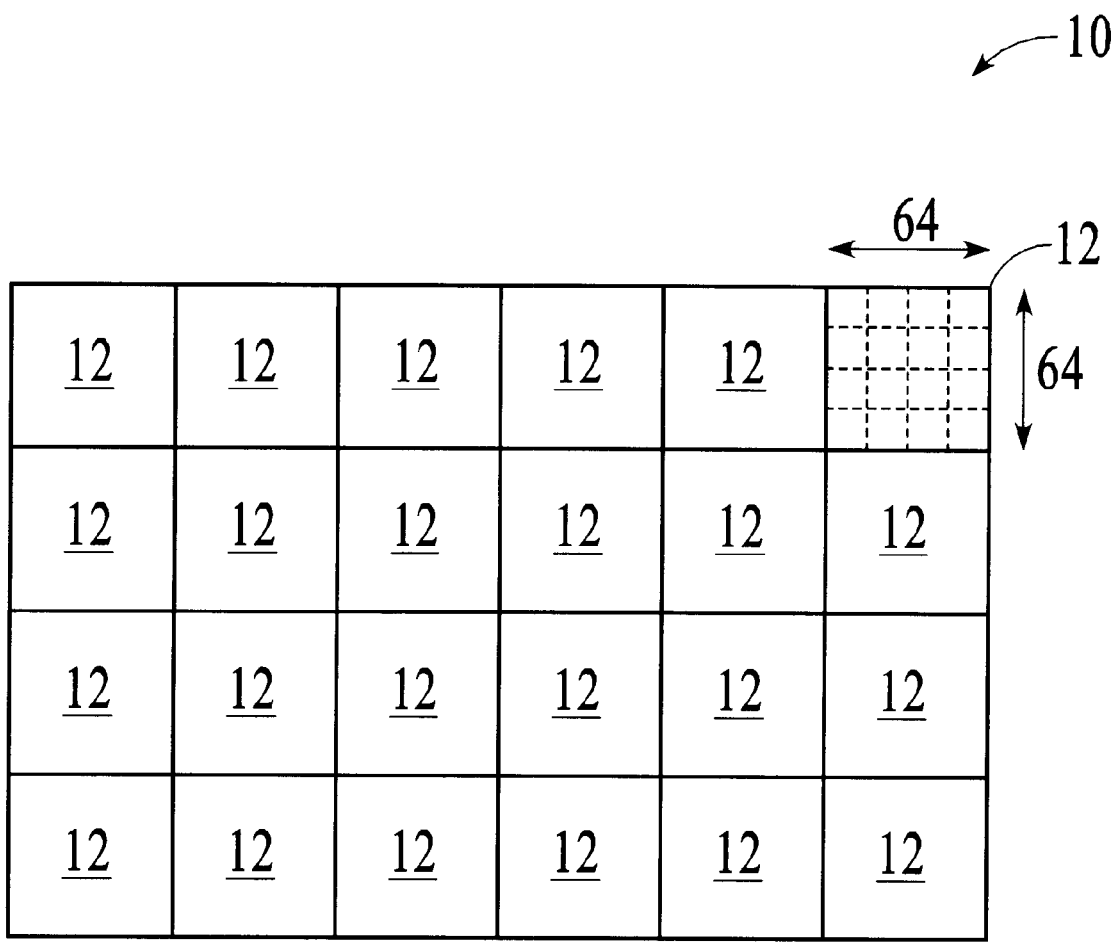
FIG. 1a illustrates a representation of a typical tiled image.
Figure 7:
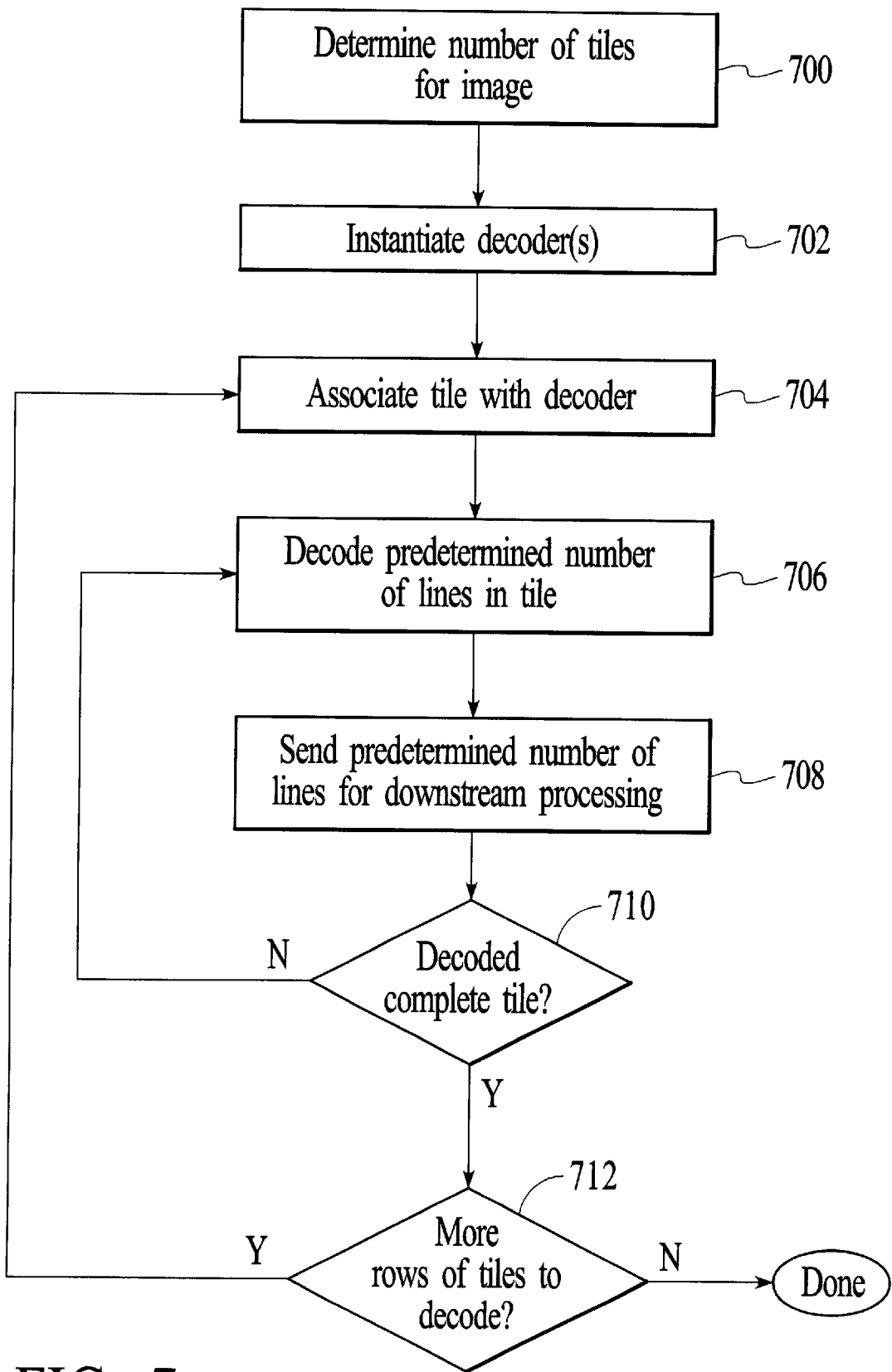
FIG. 7 illustrates a flow diagram of a process for decompression in accordance with the present invention.

In the output production of images, e.g., for display on LCD 402, image data compressed in accordance with image processors 606 requires decompression. In accordance with the present invention, memory requirements during decompression are minimized (e.g., in working memory 530), as described with reference to FIGS. 7 and 8. FIG. 7 illustrates a preferred process of decompressing tiled imaged image data, e.g., JPEG compressed tiled image data. The process initiates by determining the number of tiles in an image, including a number of tiles per row of the image (step 700). For the example tiled image 10 shown in FIG. 1a, the number of tiles is 24 with 6 tiles per row. At least one decoder is then instantiated (step 702), the at least one decoder providing suitable decompression operations for the bitstream, e.g., JPEG decompression operations, as are well understood in the art. In a preferred embodiment, one decoder per tile in an image row is provided, where instantiation suitably comprises creating an instance of a suitable software decoder for each tile across a row. Alternatively, multiple hardware decoders could be provided and utilized in parallel. For the image 10, six decoders would be provided for the six tiles 12 of a row. Each decoder is then suitably associated with a particular tile (step 704).

Decoding of a predetermined number of lines of data for each tile by each decoder occurs (step 706). By way of example, sixteen lines of each tile are decoded. Of course, other numbers of lines, such as eight, may be chosen depending upon the needs of a system, e.g., depending upon the size of the macroblocks, as is well understood by those skilled in the art. The decoded lines from each decoder are then transferred for downstream image processing (step 708), e.g., for further image processing to display the decompressed image data on LCD 402. A determination of whether each tile has been completely decoded occurs (step 710). When more data needs to be decoded in a tile, the process returns to step 706 for decoding of an additional predetermined number of lines of data. In the example of 64×64 tiles with sixteen lines being decoded by each decoder, four passes are needed through each decoder for each tile.

Since the preferred decoders are separate instantiations of a software decoder, each decoder requires preservation of its state. Thus, once the chosen number of lines of data has been decompressed, all the decoders are halted and their state preserved, as is well understood by those skilled in the art, so that the system can then operate on the band of image data. Once the system has finished with the band of image data, the decoding processes are resumed, each decoder picking up from where it was halted within its own incoming bitstream. Thus, only the chosen number of lines for forming a scan line of the image need to be buffered.

Once the complete tile has been decoded, (i.e., step 710 is affirmative), a determination of whether more rows of tiles need to be decoded is made (step 712). When more tiles exist, the processing continues from step 704 with associating a next set of tiles with decoders, one decoder per tile. Once all of the data in all of the tiles has been decoded and sent downstream, the decompression processing of the filed image data is completed (i.e., step 712 is negative).

In an alternate embodiment, a single decoder instantiation could be utilized, where the chosen number of lines of a first tile is decoded by the decoder, and the state is saved before decoding the chosen number of lines for the next tile in the row, saving the state, and so on, until the entire number of tiles in each row are decoded. While using a single decoder would require the saving of the state and resumption for a next pass through the decoder for each tile, the storage requirements for the state information remains much smaller than that required to store decompressed data for entire tiles, as is needed in some single decoder prior art configurations.

Figure 8:
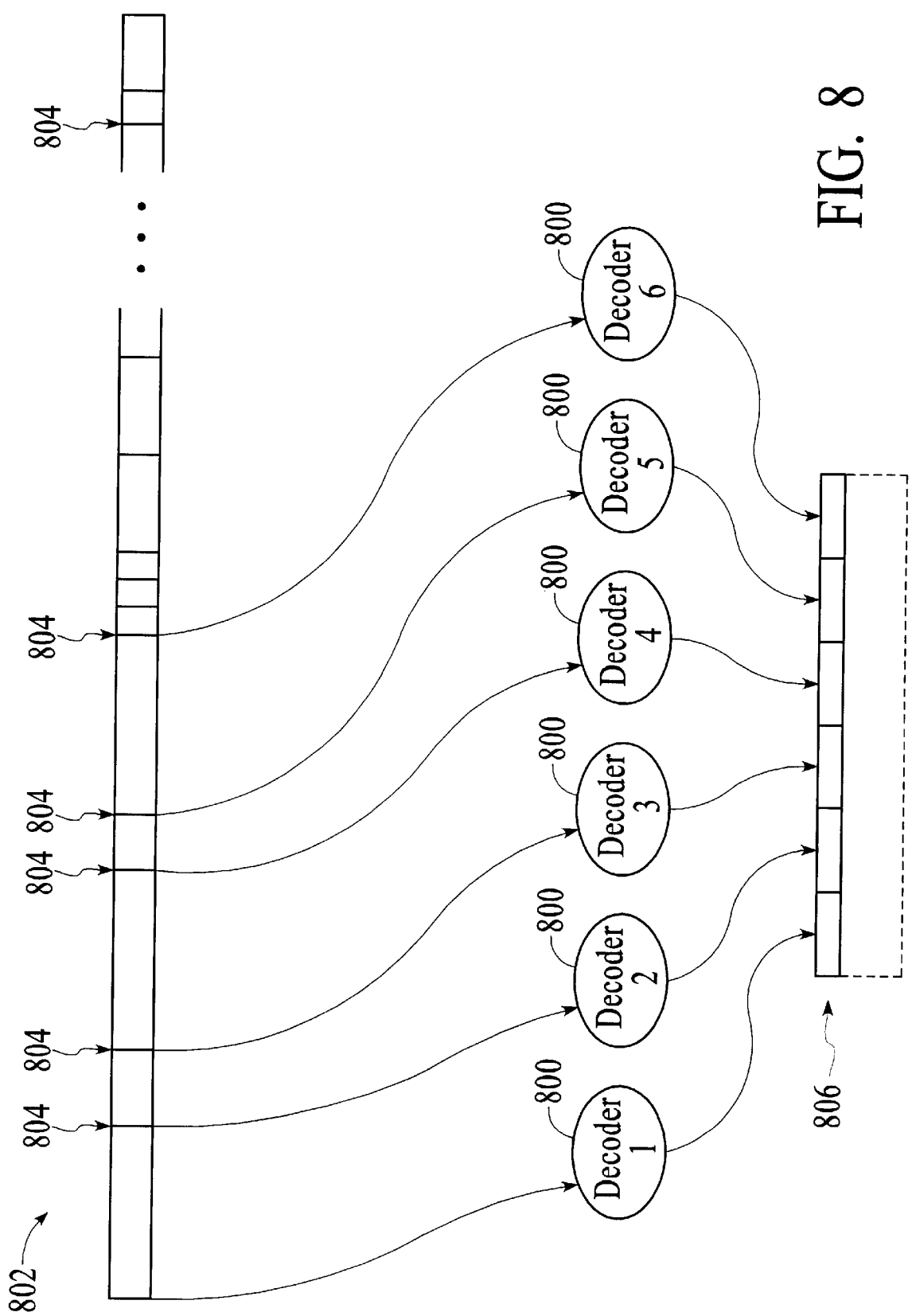
FIG. 8 illustrates a representation of an arrangement of decoders in accordance with the present invention.

FIG. 8 schematically illustrates plural decoders 800 for decoding data from a compressed stream 802. Within a JPEG compressed stream, each tile's data is normally treated as a separate image. Thus, in accordance with JPEG, in which byte alignment is used for images within a compressed stream, each tile's data in stream 802 is byte-aligned, which allows for identification of the tiles within the stream 802, as is well appreciated by those skilled in the art. Boundaries between tiles within the compressed stream 802 are symbolically shown as lines 804, which are merely shown for illustrative purposes and are not meant to represent markers or other such designators as is required and utilized by some prior art techniques. As shown, each decoder 800 operates independently filling up its portion of a band buffer 806 substantially simultaneously, the portions being evenly spaced between the tiles, e.g., 64 wide. In the exemplary embodiment, with sixteen lines of data being utilized during image processing, only sixteen lines are needed in band buffer 806. In contrast to the prior art of FIG. 1b, where 64 lines are needed in band buffer 18, the exemplary embodiment of the present invention achieves approximately a 75% reduction in the amount of memory required (e.g., from 64 to 16 lines, represented by the narrower rectangles for band buffer 806 in contrast to buffer 18).

Although the present invention has been described in accordance with the embodiments shown, one of ordinary skill in the art will readily recognize that there could be variations to the embodiments and those variations would be within the spirit and scope of the present invention. For example, although the compressed bitstream and decompression operations have been described in terms of the JPEG standard, the present invention is suitable for use with other image compression standards that allow for the use of tiled image data, as is well appreciated by those skilled in the art. Accordingly, many modifications may be made by one of ordinary skill in the art without departing from the spirit and scope of the appended claims.

What is claimed is:

1. A method for reducing memory storage requirements during decompression of tiled image data, the method comprising:
    identifying a number of tiles in each row of an image; and
    decompressing a bitstream of compressed image data from the number of tiles in parallel to fill a band buffer with a minimum number of lines needed for processing a scan line of the image, wherein the minimum number of lines is less than a total number of lines in a tile.

2. The method of claim 1 wherein decompressing further comprises instantiating a plurality of software decoders equal in number to the identified number of tiles; and associating each tile in the row with one software decoder of the plurality of software decoders.

3. The method of claim 2 wherein decompressing further comprises decoding the minimum number of lines of image data from each tile for storage in the band buffer; and proceeding with desired image processing on the decoded minimum number of lines.

4. The method of claim 3 wherein the minimum number of lines comprises sixteen lines.

5. The method of claim 4 wherein the total number of lines comprises sixty-four lines.

6. The method of claim 3 further comprising determining whether all lines in each tile have been decoded, wherein when all lines have not been decoded, a subsequent set of the minimum number of lines is decoded.

7. The method of claim 6 wherein when all lines in each tile have been decoded, the method further comprises determining whether another row of tiles requires decoding, wherein when there is another row of tiles, the method continues with associating a next row of tiles with the plurality of decoders.

8. The method of claim 7 wherein when there is not another row of tiles, the decompressing is completed.

9. The method of claim 1 wherein decompressing comprises JPEG decompression.

10. A system for decompressing tiled image data with reduced storage requirements, the system comprising:
    memory for storing compressed image data as a bitstream from a plurality of image tiles; and
    an image processor coupled to the memory for processing scan lines from the compressed image data to achieve output of a digital image by identifying a number of image tiles in each row of an image and decompressing the bitstream from the number of image tiles in parallel to fill a band buffer with a minimum number of lines needed for processing a scan line of the image, wherein the minimum number of lines is less than a total number of lines in a tile.

11. The system of claim 10 wherein the image processor further instantiates a plurality of software decoders equal in number to the identified number of image tiles, and associates each image tile in the row with one software decoder of the plurality of software decoders.

12. The system of claim 11 wherein the image processor further decodes the minimum number of lines of image data from each image tile for storage in the band buffer, and proceeds with desired image processing on the decoded minimum number of lines.

13. The system of claim 12 wherein the minimum number of lines comprises sixteen lines.

14. The system of claim 13 wherein the total number of lines comprises sixty-four lines.

15. The system of claim 12 wherein the image processor further determines whether all lines in each tile have been decoded, wherein when all lines have not been decoded, the image processor decodes a next set of the minimum number of lines from each image tile.

16. The system of claim 15 wherein when all lines in each image tile have been decoded, the image processor further determines whether a next row of image tiles requires decoding, wherein when there is a next row of image tiles, the next row of image tiles is associated with the decoders.

17. The system of claim 16 wherein when there is not another row of image tiles, the decompressing is completed.

18. The system of claim 10 wherein decompressing comprises JPEG decompression.

19. A method for decompressing tiled image data comprising:
    determining a number of tiles forming an unmarked compressed stream of image data for an image;
    instantiating at least one decoder for decoding each tile in a row of the image;
    decoding a predetermined number of lines of image data from each tile for storage in a band buffer; and
    proceeding with desired image processing on the decoded predetermined number of lines, wherein the decoded number of lines in the band buffer is less than a total number of lines in each tile.

20. The method of claim 19 further comprising associating each tile in the row with the at least one decoder after the step of instantiating.

21. The method of claim 20 wherein the predetermined number of lines is sixteen.

22. The method of claim 20 further comprising determining whether all lines in each tile have been decoded, wherein when all lines have not been decoded, a next set of the predetermined number of lines is decoded.

23. The method of claim 22 wherein when all lines in each tile have been decoded, the method further comprises determining whether all the tiles have been decoded, wherein when all the tiles have not been decoded, a next set of tiles is associated with the at least one decoder.

24. The method of claim 23 wherein when all the tiles have been decoded, the decompressing is completed.

25. The method of claim 19 wherein the at least one decoder comprises at least one software decoder.

26. The method of claim 19 wherein the at least one decoder comprises at least one hardware decoder.

27. The method of claim 20 further comprising saving a state of the at least one decoder after the step of decoding.

* * * * *